Oct. 20, 1942.　　　　R. A. VILLANI　　　　2,299,362
ROTARY ADVERTISING MIRROR
Filed Nov. 25, 1940　　　　2 Sheets-Sheet 1

INVENTOR:
Romeo Antonio Villani
BY
Young, Emery & Thompson
ATTORNEYS

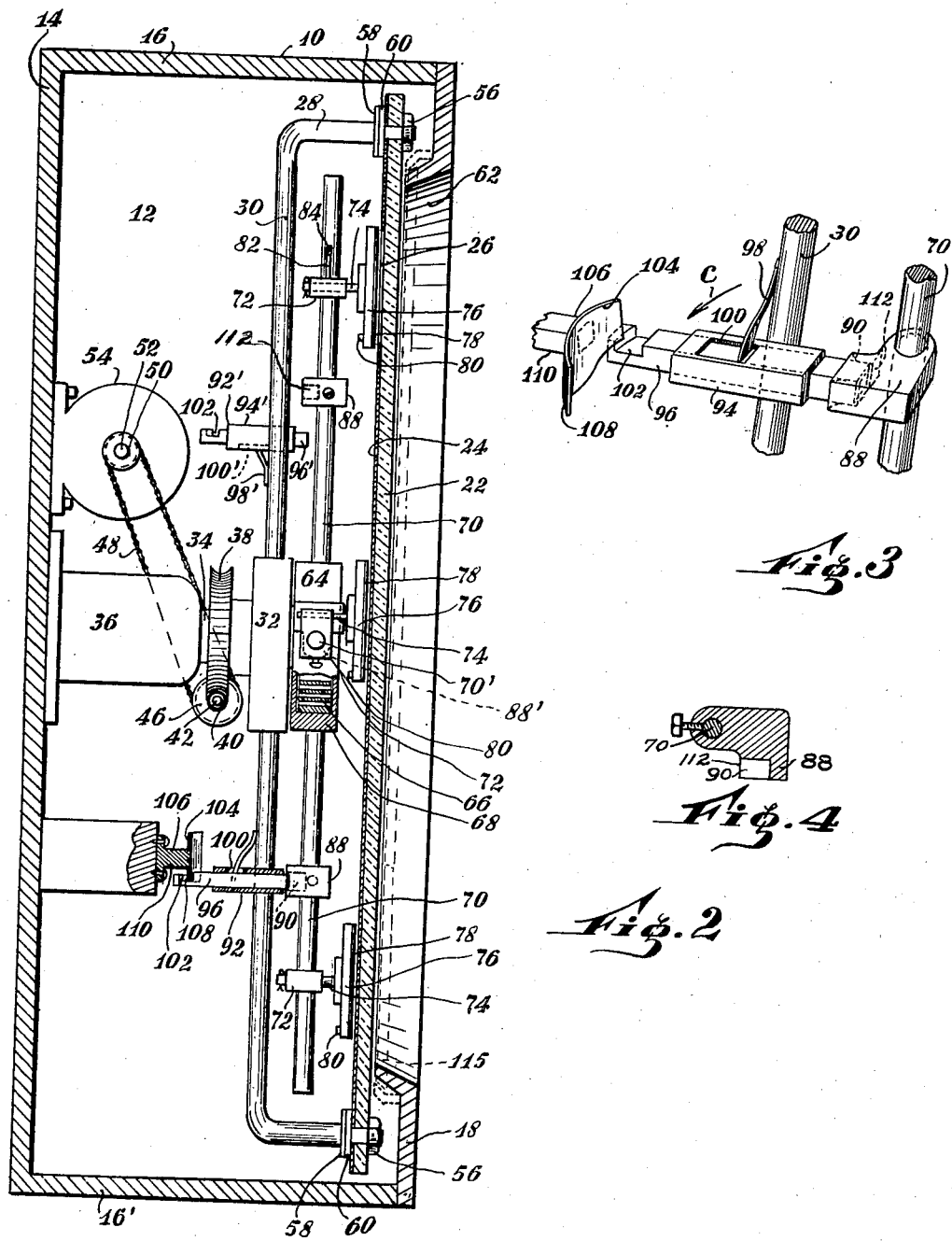

Patented Oct. 20, 1942

2,299,362

UNITED STATES PATENT OFFICE 2,299,362

ROTARY ADVERTISING MIRROR

Romeo Antonio Villani, San Isidro, Argentina

Application November 25, 1940, Serial No. 367,126

3 Claims. (Cl. 40—34)

The present invention relates to mirrors, and particularly to mirrors used for advertising purposes, and has for its principal object to provide a new and improved type of rotary mirror the reflecting surface of which is removed at one or more points to allow advertising matter to be seen from the front, said advertising matter being applied to a plurality of discs pivoted to a like plurality of rotary arms, said mirror being carried by another plurality of positively driven rotary arms and means being provided for establishing and disestablishing operative connection between the last mentioned arms and the first mentioned arms, said means including spring means operatively associated with said first mentioned arms for automatically causing displacement of said first mentioned arms with respect to the second mentioned arms, upon disestablishment of operative connection between the two sets of arms.

A further object of the present invention is to provide a novel and attractive advertising device of low running cost and relatively cheap to construct, in which the advertising matter, as seen from the front of the device, appears to move in a circular orbit in the reflecting surface of a mirror, while remaining oriented for ordinary reading throughout its travel.

These and other objects and advantages of the present invention will be made apparent in the course of the following detailed description of a preferred embodiment thereof which has been illustrated in the accompanying drawings, in which:

Fig. 2 is a side elevation to a larger scale and partly in section of the rotary advertising mirror of Fig. 1, and Fig. 3 is a perspective view of the essential parts of the means for establishing and disestablishing operative connection between the mirror carrying and the advertisement carrying arms.

Fig. 4 is a horizontal sectional view through a clutch part shown in Fig. 3.

Figure 1:
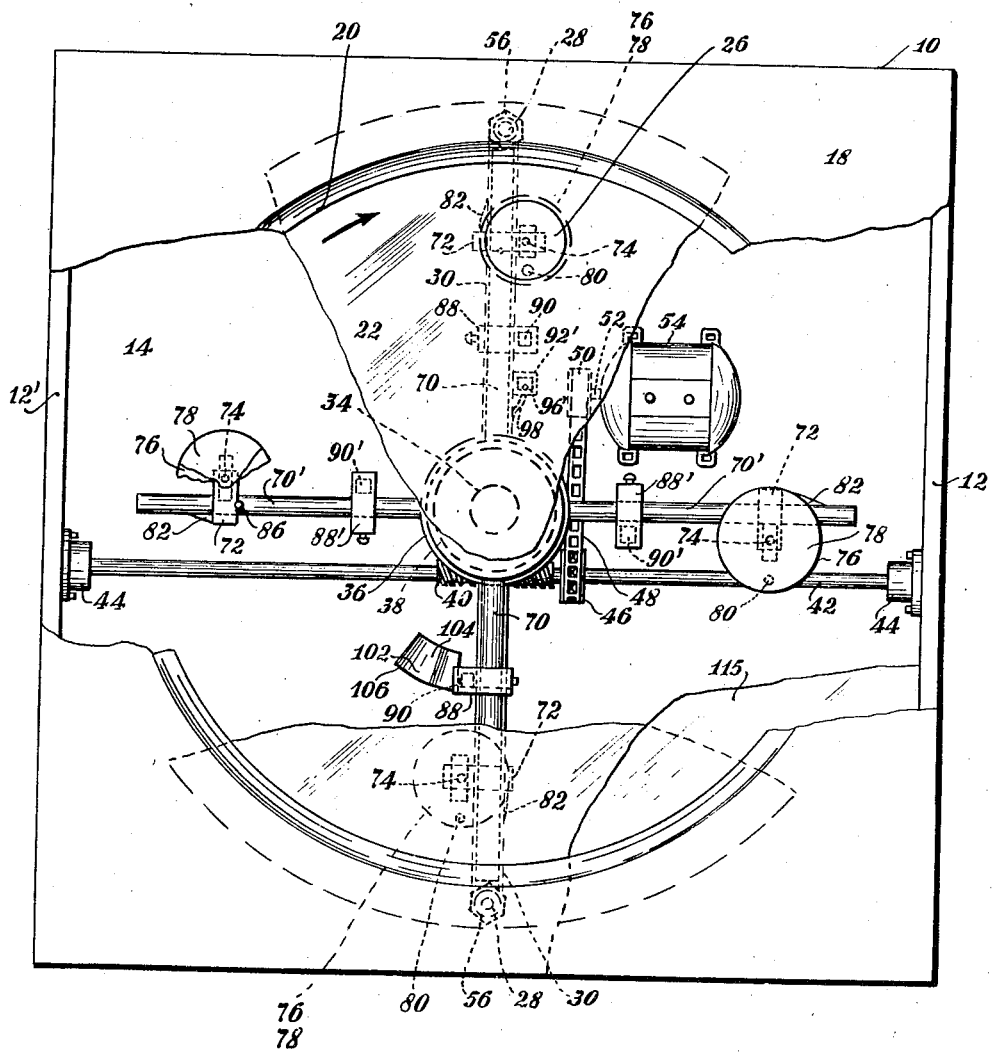
Fig. 1 is a front elevation with certain portions broken away of a rotary advertising mirror in accordance with the present invention.

According to the embodiment illustrated in the drawings, the novel rotary advertising mirror of the present invention comprises a housing 10 having side walls 12, 12', a back 14, top and bottom walls 16, 16' (Fig. 2) and a front 18 having a relatively large opening 20, which is preferably circular as shown. Behind the opening 20 there is provided a circular mirror 22 having a backing or reflecting coating 24 which is removed at one or more points—in the embodiment shown in one point only—to provide a circular transparent area or areas 26. The mirror is mounted on the ends 28 of a plurality of mirror carrying arms 30 which extend radially from a hub 32 rotatably mounted on an axle 34 which extends normally with respect to the back 14 of the housing 10 and is secured thereto as by means of a pedestal 36. The hub 32 has secured to it a worm wheel 38 meshing with a worm 40 mounted on a shaft 42 rotatably supported in bearings 44 secured to the inside faces of the side walls 12, 12'. Fast on the shaft 42 is a sprocket 46 operatively connected by means of a chain 48 to a driving sprocket 50 fast on the shaft 52 of a fractional horse-power electric motor 54 mounted on the back 14, of the housing 10. Thus it will be understood that rotation of the motor armature or rotor will drive the hub 32 positively and hence positively rotate the mirror 22. In Fig. 1, the apparatus is shown arranged for clockwise rotation of the mirror, and in Fig. 2 the lower arm 30 is to be taken as about to move out of the plane of the paper towards the observer.

It will be understood that the ends 28 of the radial mirror carrying arms 30 are bent away from the back 14 and towards the front 18 of the housing so as to carry the mirror in a plane parallel to the plane of the opening 20. The distance between the center lines of the said ends 28 is greater than the diameter of the opening 18, so as to allow a portion of the front to extend beyond and thus conceal the end faces of said ends. The mirror is secured to the ends 28 as by means of nuts 56 to receive which the extremities of said ends 28 are threaded. Stops 58 are provided on the ends 28, and preferably compressible washers 60 as for example of cork or felt, are interposed between said stops 58 and the mirror 22. To conceal these nuts, which may project forwardly from the mirror surface, the front 18 is provided with an inwardly turned lip 62 surrounding the opening 20.

Since the operation of the device can be completely described when only two diametrically opposite mirror carrying arms are provided, only this number has been shown in the drawings, although it is to be understood that generally more than one pair of arms will be required to give adequate support to the rotary mirror.

The advertisement carrying device comprises a hollow hub 64 rotatably mounted on the axle 34 between the hub 32 and the mirror 22, and resiliently coupled to the axle by means of a watch spring 66 located within the hollow of the hub 64 and having its inner end secured to the axle 34 and its outer end secured to the inside of the outer hub wall 68. The spring 66 is designed to permit the hollow hub 64 to make at least one complete revolution before the spring is sufficiently wound to impede its further rotary progress of the hollow hub. Extending radially from said hollow hub is a plurality of advertisement carrying arms which are arranged in diametrically opposed pairs 70 and 70'. The advertisement carrying arms are shorter than the mirror carrying arms 30 so that they are free to rotate within the space defined by the ends 28. Near the free end of each advertisement carrying arm there is detachably secured thereto an advertisement supporting member 72 through which a shaft 74 passes in a direction normal to the mirror. The end of the shaft 74 nearest the mirror terminates in a disc 76 to or on the face of which next to the mirror is applied advertising matter represented in the drawings as a paper disc 78 adhering to the disc 76. The arrangement is such that the advertisement bearing faces of the discs 76—in the present case, the paper discs 78—are as close to the reflecting coating 24 of the mirror as is consistent with movement of the discs relatively to the mirror in a plane parallel thereto. The discs are provided with counterweight 80 so that, being free to rotate with respect to the supporting members 72, the discs and consequently the advertising matter borne by them will always maintain its original orientation with respect to the housing, at whatever point on the path of the supporting members carried round by the arms 70 or 70' when these rotate, the discs 76 may be. The diameter of the discs is somewhat larger than that of the transparent area 26 and the arrangement is such that at the start of a cycle of operations, one disc will be immediately behind said transparent area and the advertisement it bears visible therethrough from the front of the apparatus. Should there be more than one transparent area the arms 70, 70' will be so arranged that at the commencement of a cycle of operations an advertisement bearing disc is visible through each such area.

The supporting member 72 may be detachably secured to its arms 70 or 70' as shown in the drawings, by means of a shoulder 82 depressible into a slot 84 in the arms 70 so as to permit the supporting member to ride over said shoulder which afterwards acts as an outer stop, and a pin 86 passing through the arm 70 and acting as a fixed inner stop. The arrangement is similar on all the arms 70 and 70'.

The pair of arms 70 each has secured to it at the same distance from the center of rotation and between the hollow hub and the advertisement supporting member 72, a female clutch member 88, having an opening 90 facing towards the mirror carrying arms 30, that is to say, towards the back 14 of the housing 10. Each of the other pair of arms 70' has secured to it a similar female clutch member 88' having an opening 90' facing towards the back 14, said clutch member 88' being however, at a different radial distance from the hollow hub 64 than the clutch member 88, both the clutch members 88' being however at the same radial distance from the hollow hub and between it and the advertisement supporting members 72 mounted on the arms 70'.

Fast on one of the mirror carrying arms 30, for example the upper arm 30 in Figs. 1 and 2, is a male clutch member 92' located at a distance from the common center line of rotation of the hubs 32 and 64 equal to the distance from that center line to the female clutch member 88' mounted on the arms 70'. The male clutch member 92' comprises a tubular housing 94' the center line of which is normal to the mirror 22, and a bar 96' longer than said housing and slidable therein but urged towards a forward position by a leaf spring 98' one end of which is secured to the respective arms 30 and the other end of which passes through a slot 100' in the housing and is fixed to said bar 96'. The end of said bar nearest the mirror is adapted to fit into the opening 90' of the female clutch members 88' secured to arms 70', and normally projects towards said mirror a distance sufficient to enable it to penetrate into said opening 90' if the two cooperating clutch members were in operative alinement. The other end of the bar 96' has a recess or groove 102' cut in one face, said recess being adapted to engage the upper portion 104 of a retracting member 106 mounted to extend simultaneously into the paths of the male clutch member 94' of the upper arm 30 and of a similar male clutch member 94 mounted on the lower arm 30, a lower portion 108 of said retracting member 106 being adapted to cooperate with said male clutch member 94.

As best seen in Figs. 2 and 3, the retracting member 106 consists of a curved plate with its concave side facing the mirror 22, said plate having a central foot 110 projecting from the convex face thereof and thus dividing the plate into the upper portion 104 and the lower portion 108. The lower mirror carrying arm 30 in Fig. 2 has fast on it as already stated, a male clutch member 92 of construction generally similar to that of the clutch member 92', save that the recess 102 is cut on a different face of the bar 96 with respect to the center of rotation. Thus, in Fig. 2, the recess 102 is formed on the face of the bar nearest the center of rotation whereas the recess 102' of bar 96' of retracting member 92' is cut on the face here of remote from said center of rotation. Consequently when the male clutch members 92 and 92' approach the retracting member 106, one recess will engage the upper portion 104 of said retracting member and the other recess will engage the lower portion 108 thereof. In the drawings, the lower portion 108 is engaged by the recess 102 of male clutch member 92 and the upper portion 104 by the recess 102' of male clutch member 92'.

In Fig. 3 the male clutch member 92 is shown just about to engage the lower portion 104 as it approaches the retracting member 106 in the direction of the arrow c. It will be noted that the forward end of the bar 96 is in clutching engagement with the opening 90 of the female clutch member 88 mounted on arm 70, and that owing to the convexity of the retracting member in a direction away from said arm 70, further rotation of advertisement carrying arm 30 in the direction shown will cause the bar 96 to be retracted against the action of the leaf spring 98 as the recess 102 moves towards the part of retracting member 106 furthest from the arm 30. The arrangement is such that when the bar 96 is fully retracted it is disengaged from the female clutch member 88. Further rotation of the arm 30 in the direction shown in Fig. 3, cause the recess 102 to move over the remaining part of the lower portion 108 of the retracting member 106, which curves forwardly and thus allows the bar 96 to return to its initial forward position under the action of spring 98.

The disengaged position of the pair of clutch members 92 and 88 is shown at the lower part of Fig. 2. The parts are so interrelated that when the lower arm 70 has reached the neighbourhood of the retracting member 106, the clock spring 66 is sufficiently wound to cause snap action rotary separation of arms 70 and 30 as soon as the bar 96 is fully retracted from the opening 90 of the female clutch member 88. The clock spring 66 is arranged so that the movement it imparts to the advertisement carrying assembly is in a sense contrary to the rotation of the mirror carrying arms.

Referring now to Fig. 1, in which the mirror carrying arms 30, are assumed to rotate in a clockwise direction, it will be seen that in view of the conditions above described, when the clutching engagement between the lower arm 30 and the lower advertisement carrying arm 70 is broken, the arms 70, 70' will rotate counter-clockwise thus causing the female clutch member 88' secured to the right hand arm 70' to move towards the male clutch member 92' attached to the upper arm 30, which itself continues its rotation in the clockwise direction thus in its turn causing the male clutch member 92' to approach the female clutch member 88'. When the two clutch members are just about to commence transit, the bar 96' of the male clutch member 92' enters the opening 90' of the female clutch member 88', said opening having an entrance indicated at 112 in Fig. 3 on the side of said clutch member facing counter to the direction of rotation of the mirror carrying arms 30. Thus clutching engagement will be established between the upper arm 30 and the right hand arm 70' the reference being to Fig. 1, and moreover, since it is to be supposed that the advertising matter borne by the disc 76 is different for each disc, as a result of the above sequence of events, the advertising matter originally visible through the transparent area 26 will have been replaced by the new matter appearing on the disc associated with the right hand arm 70' (Fig. 1).

In the arrangement shown in the drawings, the change of advertising matter will take place every quarter revolution of the mirror since there are four discs carrying arms 70, 70', and the changes will occur in the same sequence, owing to the relative positions of the clutch members as hereinbefore explained.

Obviously, a greater or lesser number of advertisement carrying arms may be provided and there may be more than one transparent area, in which event, more than one set of advertising matter will be visible from the front. Also more than one retracting member may be provided so as to increase the frequency of change of visible advertising matter.

The rotary advertising mirror according to the present invention may be installed in any convenient place, preferably so that the public may see its reflection in the mirror. When intended to be installed in a position within reach of the public, it is preferred to interpose a sheet of plain glass 115 between the front 18 and the mirror 22 so as to prevent the mirror from being touched and thereby stopped as well as to keep the public from discovering the illusion it creates. The interposition of such a sheet of glass renders it possible to conceal the actual change-over from one set of advertising matter borne by one disc to another set borne by another disc, by silvering or otherwise rendering opaque an area or areas of the sheet of plain glass coinciding with the change-over position, which, as will readily be understood is fixed with respect to the housing 10 in any one embodiment of the invention since the retracting member or members 106 are fixed with respect to the back 14 of the housing 10.

From the foregoing it will be seen, that the novel rotary advertising mirror according to the present invention provides an attractive advertising means in which the advertising matter appears to float in the surface of the mirror itself and to suffer abrupt changes the performance of which is not readily perceptible. The apparatus is comparatively cheap to construct and the running and maintenance costs are of a very low order. The back or front may be hinged to the housing so as to allow of access to the interior for the purpose of attending to the mechanism or changing the advertising matter. The latter operation may readily be accomplished by depressing the shoulders 82 and removing the supports 72 from the arms 70, 70' together with their discs 76. After changing the advertising matter, the support is slipped onto the arm over the depressible shoulder.

It is to be understood that the present invention is not to be deemed limited to the embodiment shown and described but that modifications of constructional details and general design may be made without departing from the nature and scope of the present invention as defined in the appended claims.

I claim:

1. An advertising device comprising, a housing with a front wall having a central opening therein, a mirror rotatably mounted in said housing parallel to said front wall behind the said opening said mirror having at least one transparent area, a support rotatably mounted in said housing concentric with said mirror said support having a plurality of circumferentially spaced holding discs for advertising matter located behind said mirror and capable of registering with said transparent area to be visible through it, means for rotating said mirror, spring means coupling said mirror to said support, a plurality of clutch devices circumferentially disposed similarly to said discs between said mirror and support, and means in said housing for successively disengaging the clutch devices as the mirror rotates after a period of engagement in which the transparent area of the mirror traverses the distance between one holding disc and another, the spring coupling being arranged to rotate said support backwardly upon its disengagement from the mirror to bring another advertisement-bearing disc into register with said transparent area.

2. An advertising device according to claim 1 in which each clutch device includes a bar carried by the mirror, a spring normally holding said bar in clutch-engaging position, and a member on the support having an entrance engageable by said bar when it becomes aligned with said member during rotation of the mirror, and in which said disengaging means includes a stationary cam cooperating with said bar to retract it briefly into clutch disengaging position against the action of said spring.

3. An advertising device according to claim 1 in which the mirror is supported by a plurality of arms extending radially from a hub, and the support for the advertising discs has a plurality of radial arms parallel to the arms of the mirror, and in which the clutch devices include pairs of cooperating elements one of each pair being on an arm of the support and the other on an arm of the mirror.

ROMEO ANTONIO VILLANI.